US009398041B2

(12) United States Patent  
Beskrovny et al.

(10) Patent No.: US 9,398,041 B2  
(45) Date of Patent: Jul. 19, 2016

(54) IDENTIFYING STORED VULNERABILITIES IN A WEB SERVICE

(71) Applicant: International Business Machines Corporation, Armonk, NY (US)

(72) Inventors: Evgeny Beskrovny, Ramat Gan (IL); Omer Tripp, Har Adar (IL); Emmanuel Wurth, Muret (FR)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 13/794,882

(22) Filed: Mar. 12, 2013

(65) Prior Publication Data

US 2014/0283080 A1  Sep. 18, 2014

(51) Int. Cl.
*G06F 11/00* (2006.01)
*H04L 29/06* (2006.01)
*G06F 21/57* (2013.01)

(52) U.S. Cl.
CPC .......... *H04L 63/1433* (2013.01); *G06F 21/577* (2013.01)

(58) Field of Classification Search
CPC .......................... H04L 63/1433; G06F 21/577
USPC ........................................................ 726/25
See application file for complete search history.

(56) References Cited

U.S. PATENT DOCUMENTS

| 7,954,091 | B2 * | 5/2011 | Li et al. .......................... 717/135 |
| 8,099,760 | B2 * | 1/2012 | Cohen et al. ...................... 726/2 |
| 2006/0036682 | A1 * | 2/2006 | Fletcher et al. ................ 709/203 |
| 2006/0090206 | A1 * | 4/2006 | Ladner et al. .................... 726/25 |
| 2006/0277606 | A1 * | 12/2006 | Yunus et al. ..................... 726/25 |
| 2007/0169199 | A1 * | 7/2007 | Quinnell ............... G06F 21/577 726/25 |
| 2011/0208469 | A1 * | 8/2011 | Sheye ........................... 702/123 |
| 2014/0165193 | A1 * | 6/2014 | El-Rafei et al. ................. 726/22 |

FOREIGN PATENT DOCUMENTS

| JP | 2008299540 | 12/2008 |
| WO | 2006044835 A2 | 4/2006 |
| WO | 2011102605 A2 | 8/2011 |

OTHER PUBLICATIONS

Sheyner, O. and Wing, J., Nov. 2003, Tools for generating and analyzing attack graphs. In Formal methods for components and objects (pp. 344-371). Springer Berlin Heidelberg.*

(Continued)

*Primary Examiner* — Yin-Chen Shaw  
*Assistant Examiner* — Carlos Amorin  
(74) *Attorney, Agent, or Firm* — Noah A. Sharkan

(57) ABSTRACT

A computer identifies each web method, of a web service, declared in a web services description language (WSDL) file. The computer adds a node within a directed graph for each web method identified. The computer identifies pairs of web methods declared in the WSDL file in which a match exists between an output parameter of one of the web methods and an input parameter of another one of the web methods. The computer adds an edge within the directed graph for each of the pairs of web methods identified. The computer generates one or more sequences of web methods based on nodes connected by edges within the directed graph, wherein each of the one or more sequences includes at least one of the pairs of web methods identified. The computer tests each of the one or more sequences of web methods to identify stored vulnerabilities in the web service.

12 Claims, 8 Drawing Sheets

(56) References Cited

OTHER PUBLICATIONS

Yu, Weider D., Dhanya Aravind, and Passarawarin Supthaweesuk. "Software vulnerability analysis for web services software systems." In Computers and Communications, 2006. ISCC'06. Proceedings. 11th IEEE Symposium on, pp. 740-748. IEEE, 2006.*

Rajan, Hridesh, Jia Tao, Steve M. Shaner, and Gary T. Leavens. "Reconciling Trust and Modularity Goals in Web Services." (2009).*

Oh, Seog-Chan, Dongwon Lee, and Soundar RT Kumara. "Effective web service composition in diverse and large-scale service networks." Services Computing, IEEE Transactions on 1, No. 1 (2008): 15-32.*

Balduzzi; Automated Detection of HPP Vulnerabilities in Web Applications @ BlackHat USA 2011@.

Bozkurt, et al.; "Testing Web Services: A Survey"; Technical Report TR-10-01; Centre for Research on Evolution, Search & Testing; King's College London.

Khoury, et al.; "An Analysis of Black-Box Web Application Security Scanners against Stored SQL Injection"; 2011 IEEE International Conference on Privacy, Security, Risk, and Trust, and IEEE International Conference on Social Computing; 2011 IEEE.

Mei, et al.; "XML-manipulating test case prioritization for XML-manipulating services"; Postprint of article in the Journal of Systems and Software 84 (4); pp. 603-619; 2011.

* cited by examiner

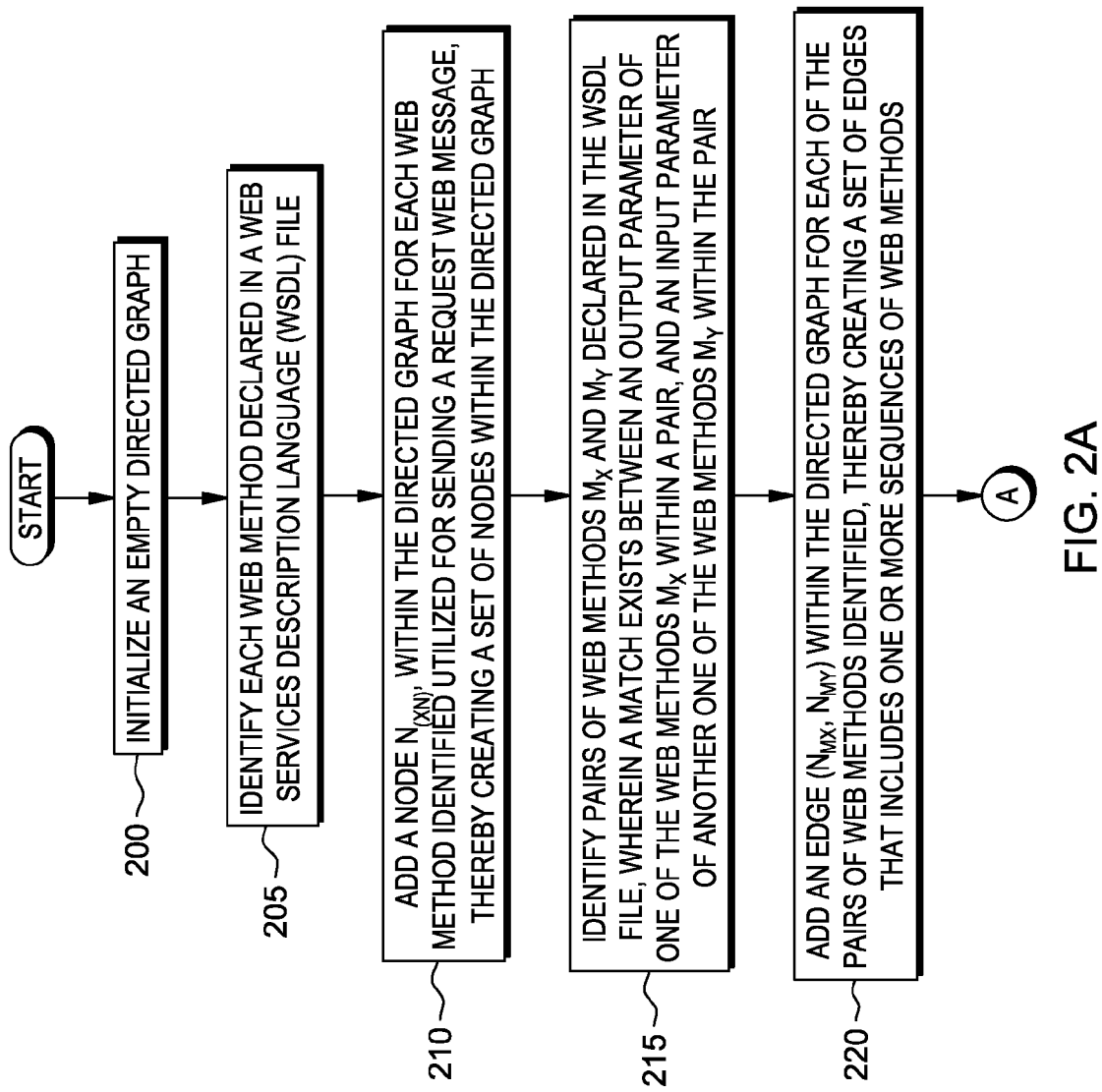

```
<"s:complexType name="Customer">      ⌐300
  <s:sequence>
    </"s:element minOccurs="1" maxOccurs="1" name="Name" type="s:string">    ⌐304
    </"s:element minOccurs="0" maxOccurs="1" name="SSN" type="s:long">       302
    </"s:element minOccurs="1" maxOccurs="1" name="Address" type="s:string"> ⌐306
  <s:sequence/>
  <s:complexType/>

<"s:complexType name="Order">         ⌐310
  <s:sequence>
    </"s:element minOccurs="1" maxOccurs="1" name="BoughtItem" type="s:string">   312   314
    </"s:element minOccurs="0" maxOccurs="1" name="PricePaid" type="s:long">
    </"s:element minOccurs="1" maxOccurs="1" name="Date" type="s:Date">      ⌐316
  <s:sequence/>
  <s:complexType/>

<"s:complexType name="OrdersArray">   ⌐320
  <s:sequence>
    </"s:element minOccurs="0" maxOccurs="unbounded" name="OrderData" type="tns:Order">   ⌐322
  <s:sequence/>
  <s:complexType/>
```

FIG. 3A

```
<"s:element name="RegisterCustomer">          ┌─330
  <s:complexType>
    <s:sequence>                              ┌─332          ┌─300
      <"s:element minOccurs="0" maxOccurs="1" name="Customer" type="tns:Customer">
    <s:sequence/>
  <s:complexType/>
<s:element/>
<"s:element name="RegisterCustomerResponse">
  <s:complexType>
    <s:sequence>                              ┌─342
      <"s:element minOccurs="1" maxOccurs="1" name="CustomerId" type="s:long">
    <s:sequence/>
  <s:complexType/>
<s:element/>
                                              ┌─350
<"s:element name="GetCustomerDetails">
  <s:complexType>
    <s:sequence>                              ┌─352
      <"s:element minOccurs="0" maxOccurs="1" name="CustomerId" type="s:long">
    <s:sequence/>
  <s:complexType/>
<s:element/>
<"s:element name="GetCustomerDetailsResponse">
  <s:complexType>
    <s:sequence>                              ┌─362          ┌─300
      <"s:element minOccurs="1" maxOccurs="1" name="Customer" type="tns:Customer">
    <s:sequence/>
  <s:complexType/>
<s:element/>
```

FIG. 3B

```
<"s:element name="GetCustomerOrders">                                           ─370
  <s:complexType>
    <s:sequence>
      </"s:element minOccurs="0" maxOccurs="1" name="CustomerId" type="s:long>  ─372
    <s:sequence/>
  <s:complexType/>
<s:element/>
<"s:element name="GetCustomerOrdersResponse>
  <s:complexType>
    <s:sequence>
      </"s:element minOccurs="1" maxOccurs="unbounded" name="Orders" type="tns:OrdersArray>  ─382  ─320
    <s:sequence/>
  <s:complexType/>
<s:element/>
```

FIG. 3C

IDENTIFYING STORED VULNERABILITIES IN A WEB SERVICE

BACKGROUND

1. Field of the Invention

The present invention relates generally to web services, and more particularly to program code for identifying stored vulnerabilities in a web service.

2. Description of the Related Art

Web services are an important building block in web architectures. Specifically, web services provide remote services to remote clients, thereby enabling online retrieval and processing of data in web applications and other web services. The rapid increase in the popularity of web services also makes them the target of a growing number of security attacks, which has led to the development of specialized testing tools for security vulnerabilities in web services.

For example, it is known for black-box security tools, such as IBM Security AppScan Standard and Enterprise Edition, to have scanning capabilities specific to web services. However, the black-box security tools are currently limited to identifying reflected injection attacks (i.e., reflected security vulnerabilities), where the tool submits an input containing a test payload, and validates whether the test succeeded based on the response from the web service.

In addition to reflected security vulnerabilities, there are persistent stored vulnerabilities, wherein the test payload does not directly flow into the response corresponding to an enclosing web service request, instead arrives at some persistent storage (e.g., a file or a database). The payload is later read due to another web service request, which triggers the inclusion of the payload in the response corresponding to the enclosing web service request.

Identifying stored vulnerabilities via black-box security tools can be challenging, because the security tools scanning a software application for stored vulnerabilities may not be aware of the internal components of the software application. The lack of awareness of the internal components of the software application makes it difficult for the security tools to identify web service request sequences capable of exposing stored vulnerabilities. Furthermore, the lack of awareness of the internal components of the software application makes it difficult to identify input parameters that trigger such sequences. As a result, current black-box scanners may not identify certain stored vulnerabilities in web services.

SUMMARY

Aspects of an embodiment of the present invention disclose a method, computer system, and program product for identifying stored vulnerabilities in a web service. A computer identifies each web method, of a web service, declared in a web services description language (WSDL) file. The computer adds a node within a directed graph for each web method identified. The computer identifies pairs of web methods declared in the WSDL file in which a match exists between an output parameter of one of the web methods within one of the pairs identified, and an input parameter of another one of the web methods within the one of the pairs identified. The computer adds an edge within the directed graph for each of the pairs of web methods identified. The computer generates one or more sequences of web methods based on nodes connected by edges within the directed graph, wherein each of the one or more sequences of web methods includes at least one of the pairs of web methods identified. The computer tests each of the one or more sequences of web methods to identify stored vulnerabilities in the web service.

BRIEF DESCRIPTION OF THE SEVERAL VIEWS OF THE DRAWINGS

The subject matter which is regarded as an embodiment of the present invention is particularly pointed out and distinctly claimed in the claims at the conclusion of the specification. One manner in which recited features of an embodiment of the present invention can be understood is by reference to the following detailed description of embodiments, taken in conjunction with the accompanying drawings in which:

FIGS. 2A and 2B are flowcharts illustrating operations of the vulnerabilities detection program that accesses both the web service of FIG. 1 and a web services description language (WSDL) file, and identifies stored vulnerabilities in the web service according to an embodiment of the present invention.

FIG. 3A illustrates, as an example, snippets of information defining various complex data types within the WSDL file, wherein the WSDL file is utilized by the vulnerabilities detection program to build a directed graph according to an embodiment of the present invention.

FIGS. 3B and 3C illustrates, as an example, snippets of information defining various web methods within the WSDL file, wherein the web methods are associated to the web service of FIG. 1 and are each represented as a node in the directed graph according to an embodiment of the present invention.

DETAILED DESCRIPTION

Figure 1:
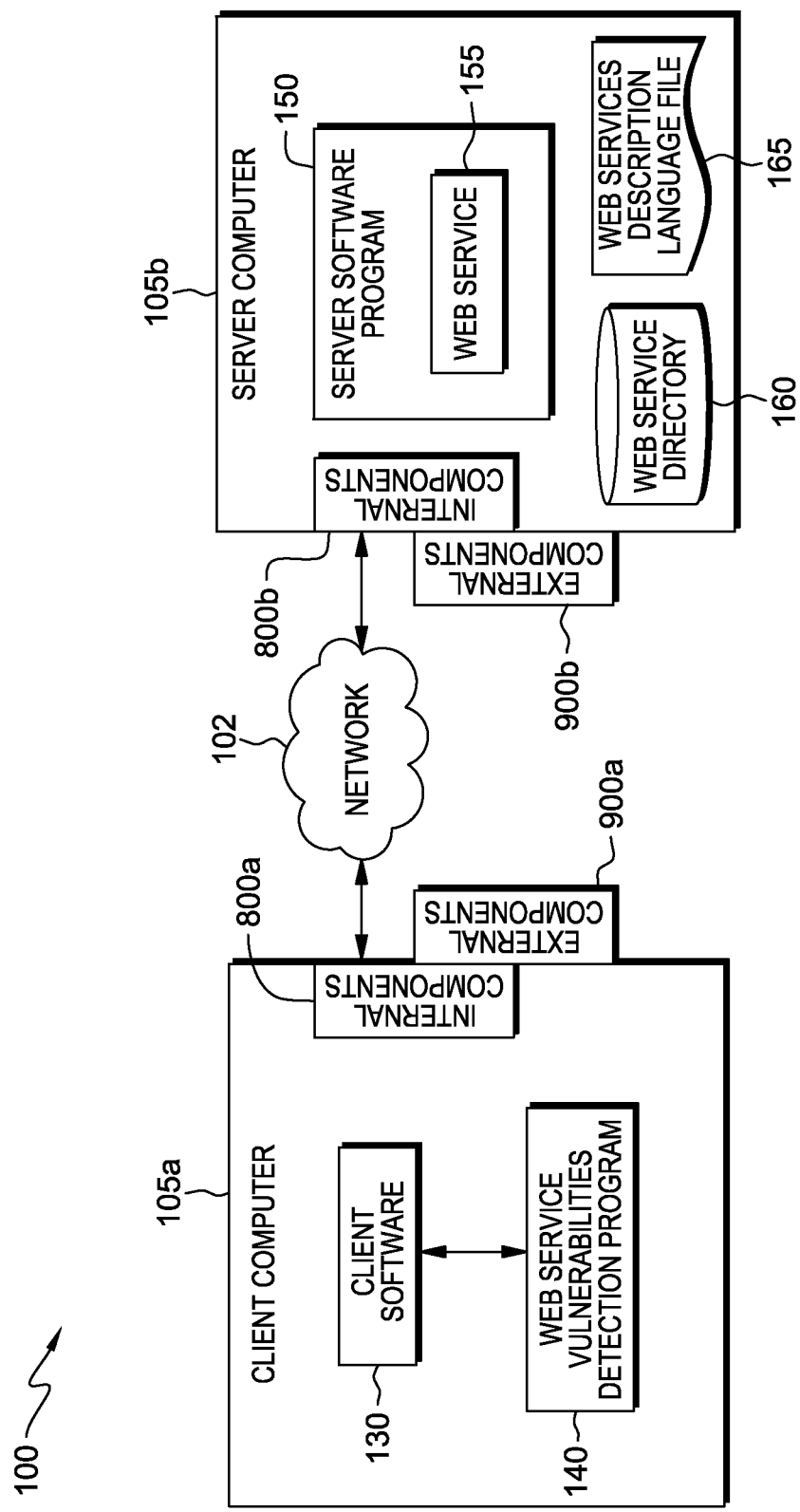
FIG. 1 is a block diagram of a distributed computer system, including a server computer and a client computer having a web service vulnerabilities detection program installed, wherein the web service vulnerabilities detection program identifies stored vulnerabilities in a web service according to an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like, conventional procedural programming languages such as the "C" programming language, a hardware description language such as VERILOG, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Exemplary embodiments now will be described more fully herein with reference to the accompanying drawings. This disclosure may, however, be embodied in many different forms and should not be construed as limited to the exemplary embodiments set forth herein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

Embodiments of the present invention provide a web service vulnerabilities detection program having program code for identifying stored vulnerabilities (i.e., stored attacks) in a web service. Stored vulnerabilities in a web service refer to a malicious value (e.g., malicious code) embedded within information data stored on a server computer. Specifically, the malicious value resides in persistent storage (e.g., in a file or in a database) on the server computer. The malicious value can be accessed by client software on a client computer (e.g., laptop, smartphone, or tablet), wherein the client software accesses the malicious value via a web service request for the information data stored on the server computer. For example, a web service that exposes banking operations may allow an end-user to register as a new account holder by entering information data (e.g., the end-user's credentials) into data fields of an electronic form, wherein subsequent to the end-user's registration the information data is stored in a database. If a malicious value (e.g., a malicious script) is entered into one of the data fields of the electronic form, and a subsequent web service request (e.g., money transfer) reads the malicious value and performs an unsafe operation based on the malicious value, then a stored vulnerability exists. The vulnerability is referred to as stored, because the malicious value is stored in persistent storage (e.g., a file or a database) prior to being included in any response to a web service request. Stored vulnerabilities can compromise the security of the information data stored on a server computer, and can even cause damage to other computers that interact with the server computer such as a client computer that sends a web service request to the server computer.

FIG. 1 illustrates computer system 100, which includes first client computer 105a, server computer 105b, and network 102. In addition, client computer 105a and server computer 105b each include respective internal components 800a and 800b, and respective external components 900a and 900b, as described below in more detail with respect to FIG. 5.

Client computer 105a is installed with client software 130 and web service vulnerabilities detection program 140. Client computer 105a can be any mobile computer device such as a laptop, smartphone, or tablet. Client software 130 can be any type of computer software application (e.g., browser, mobile application, or desktop application) that interacts with server computer 105b to access web service 155 via a formatted message, wherein web service 155 includes one or more web methods (i.e., program functions) of server software program 150 installed on server computer 105b. For example, web service 155 can include the following: a bank service; a map service; and even a government service. In addition, server computer 105b includes web service directory 160 and at least one WSDL file 165. Web service directory 160 lists all web services including web service 155 provided by server software program 150, and lists any other programs that may be installed on server computer 105b. WSDL file 165 describes web service 155. Specifically, WSDL file 165 describes parameters and parameter data types associated to each web method of web service 155. Furthermore, vulnerabilities detection program 140 is program code, wherein the program code includes functionality for generating a web service request sequence (i.e., generating a sequence of web methods) to identify stored vulnerabilities in web service 155.

Figure 2B:
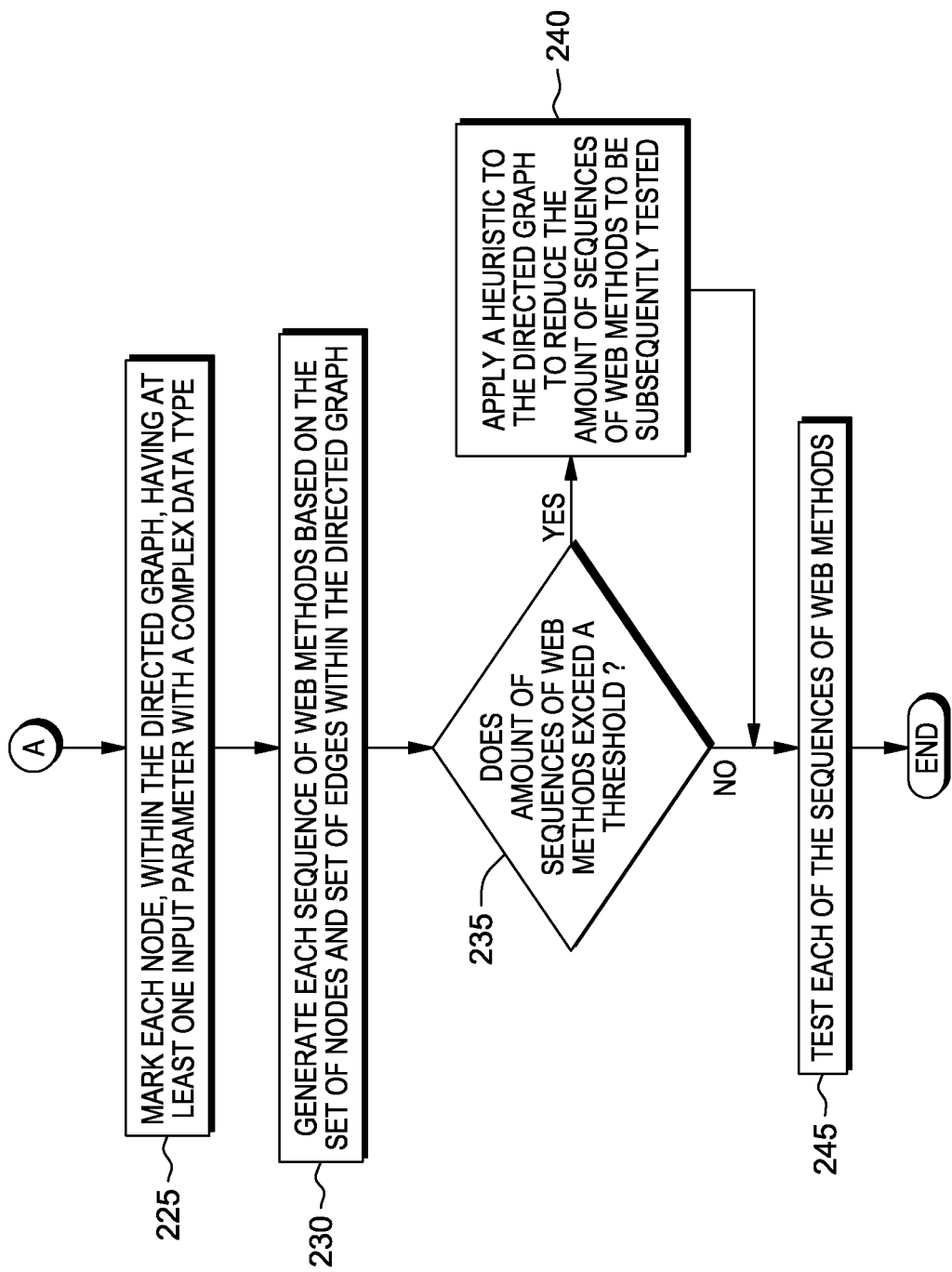

FIGS. 2A and 2B are flowcharts illustrating operations of vulnerabilities detection program that accesses both web service 155 and a web services description language (WSDL) file 165, and identifies stored vulnerabilities in web service 155 according to an embodiment of the present invention. In the disclosed embodiment, vulnerabilities detection program 140 initializes an empty directed graph (block 200). The directed graph is referred to as an empty directed graph, because the directed graph initially starts without having any nodes. Next, vulnerabilities detection program 140 identifies each web method declared (i.e., defined) in web services description language (WSDL) file 165 (block 205), and adds a node $N_{(Xn)}$ within the directed graph for each web method identified utilized for sending a request web message, thereby creating a set of nodes within the directed graph (block 210). Specifically, vulnerabilities detection program 140 gradually builds the directed graph by parsing WSDL file 165 and adding a node $N_{(Xn)}$ within the directed graph for each web method identified for a first time in WSDL file 165. The subscript Xn can be any value utilized to uniquely identify each node added within the directed graph. Thus, each node added $N_{(Xn)}$ represents a specific web method within the directed graph, and each node $N_{(Xn)}$ can be utilized by vulnerabilities detection program 140 to generate sequences of web methods for testing stored vulnerabilities in web service 155.

Subsequently, vulnerabilities detection program 140 identifies pairs of web methods $M_x$ and $M_y$ declared in WSDL file 165, wherein a match exists between an output parameter of one of the web methods $M_x$ within a pair, and an input parameter of another one of the web methods $M_y$ within the pair (block 215). The subscripts x and y can be any value utilized as a unique identifier of each web method declared in WSDL file 165. Thus, each web method declared in WSDL file 165 is assigned a unique identifier.

Specifically, in the disclosed embodiment, a match exists if the complex data type (i.e., data structure) of the output parameter of one of the web methods $M_x$ in a pair is identical to the complex data type of an input parameter of another one of the web methods $M_y$ in the pair. However, if the data type of the output parameter of web method $M_x$ in the pair is a primitive data type (e.g., boolean, byte, char, int, long, short, double, float, string), then a match exists if a name of the output parameter of web method $M_x$ in the pair is identical to a name of an input parameter of web method $M_y$ in the pair.

Next, vulnerabilities detection program 140 adds an edge $(N_{Mx}, N_{My})$ within the directed graph for each of the pairs of web methods identified, thereby creating a set of edges that includes one or more sequences of web methods (block 220). An edge is a connection (i.e., an association) between two different nodes within the directed graph. Each of the edges indicate a match exists between respective web methods $M_x$ and $M_y$. Thus, each edge $(N_{Mx}, N_{My})$ indicates a match exists between a first web method (e.g., a web method represented by a node $N_{Mx}$) and a second web method (e.g., a web method represented by a node $N_{My}$), wherein the first and second web method can be referred to as a sequence of web methods. However, a match may exist between the second web method and a third web method, and another match may exist between the third web method and a fourth web method, and so on and so forth. Thus, a sequence of web methods can include more than two web methods if there are interim web methods sharing parameters between each other.

Next, vulnerabilities detection program 140 marks each node, within the directed graph, having at least one input parameter with a complex data type (block 225). Each node marked can be utilized as a starting point for testing a sequence of web methods within web service 155 in order to identify a stored vulnerability within web service 155. Thus, each marked node represents the first web method within a sequence of web methods to be tested.

Next, vulnerabilities detection program 140 generates each sequence of web methods (i.e., each path) based on the set of nodes and the set of edges within the directed graph (block 230). Specifically, to generate each sequence of web methods vulnerabilities detection program 140 searches the directed graph by utilizing a breadth-first search to identify each node representing a web method having an output parameter that matches with at least one input parameter of another web method represented by a node within the directed graph. For example, vulnerabilities detection program 140 can utilize a breadth-first search to traverse each edge within the directed graph, and access the nodes connected by an edge in order to identify a match between an output parameter of a first web method and an input parameter of a second web method, a match between an output parameter of the second web method and an input parameter of a third web method, a match between an output parameter of the third web method and an input parameter of a fourth web method, and so on and so forth. If the amount of sequences of web methods does not exceed a threshold (the "NO" branch of decision block 235), then vulnerabilities detection program 140 tests each of the sequences of web methods (block 245). Otherwise, if the amount of sequences of web methods exceeds the threshold (the "YES" branch of decision block 235), then vulnerabilities detection program 140 applies a heuristic to the directed graph to reduce the amount of sequences of web methods to be subsequently tested (block 240). Thus, if WSDL file 165 contains a large amount of web methods, applying the heuristic can control the number of sequences of web methods subsequently tested. Next, vulnerabilities detection program 140 tests each of the sequences of web methods (block 245), and vulnerabilities detection program 140 ends.

Figure 4:
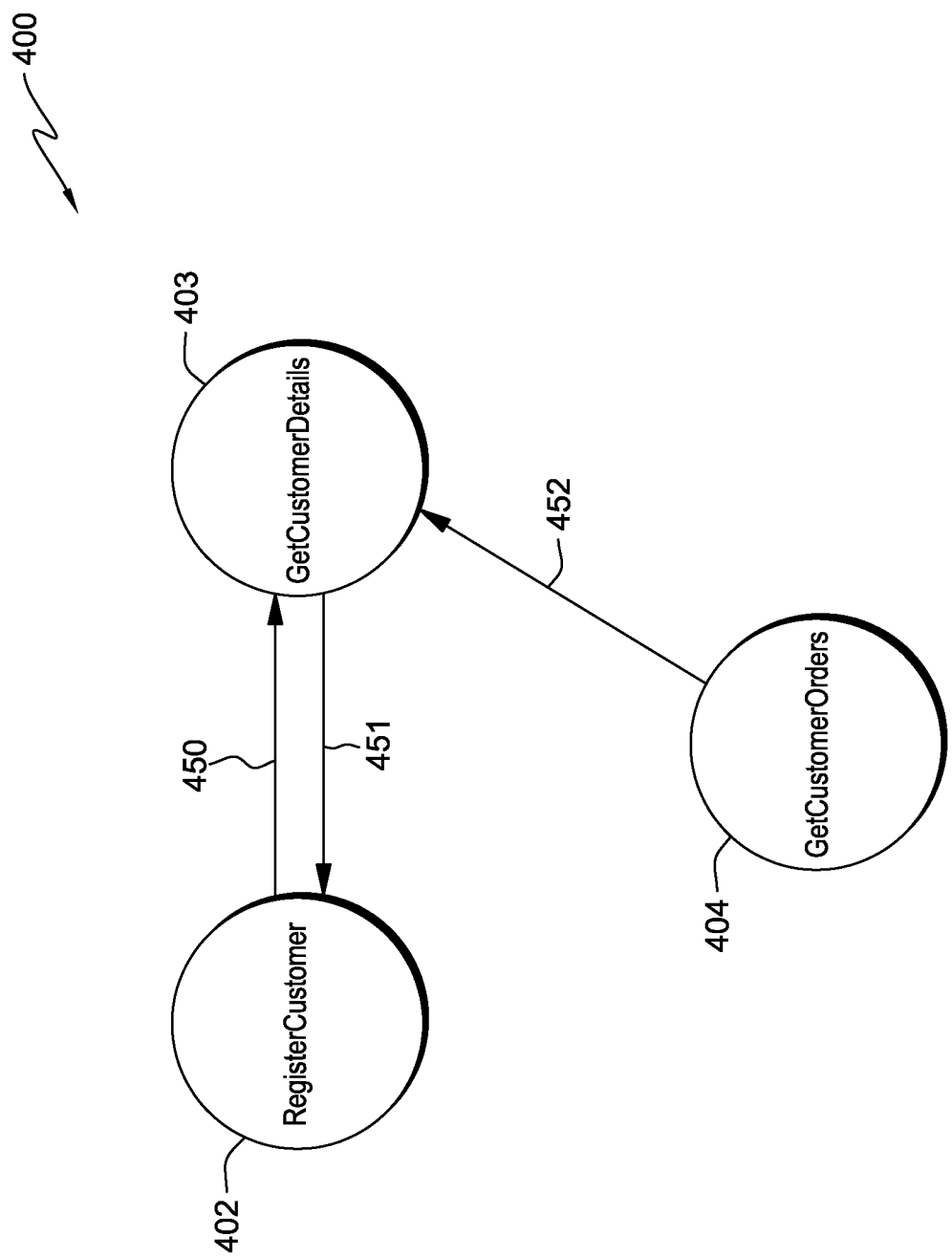
FIG. 4 illustrates the directed graph built based on the information within the WSDL file according to an embodiment of the present invention.

FIG. 3A is illustrating, as an example, snippets of information defining various complex data types within WSDL file 165, wherein WSDL file 165 is utilized by the vulnerabilities detection program to build directed graph 400 (shown in FIG. 4). Particularly, in the disclosed embodiment, Customer 300, Order 310, and OrdersArray 320 are all defined as complex data types within WSDL file 165. Customer 300 has elements that include the following: Name 302 having a data type defined as string, SSN 304 having a data type defined as long, and Address 306 having a data type defined as string. In addition, Order 310 has elements that include the following: BoughtItem 312 having a data type defined as string, PricePaid 314 having a data type defined as long, and Date 316 having a data type defined as Date. Moreover, OrdersArray 320 has a single element OrderData 322 having a data type defined as Order 310.

FIGS. 3B and 3C are illustrating, as an example, snippets of information defining various web methods within WSDL file 165, wherein the web methods are associated to web service 155 of FIG. 1, and wherein each web method utilized for sending a request web message is each represented as a node in directed graph 400 (shown in FIG. 4). Particularly, in the disclosed embodiment, RegisterCustomer 330, GetCustomerDetails 350, and GetCustomerOrders 370 are all defined as web methods within WSDL file 165. RegisterCustomer 330 has Customer 332 as an input parameter and CustomerId 342 as an output parameter, wherein Customer 332 has a complex data type defined as Customer 300 and CustomerId 342 has a data type defined as long. GetCustomerDetails 350 has CustomerId 352 as an input parameter and Customer 362 as an output parameter, wherein CustomerId 352 has a data type defined as long and Customer 362 has a complex data type defined as Customer 300. GetCustomerOrders 370 has CustomerId 372 as an input parameter and Orders 382 as an output parameter, wherein CustomerId 372 has a data type defined as long and Orders 382 has a complex data type defined as OrdersArray 320. Vulnerabilities detection program 140 can parse WSDL file 165 in order to build directed graph 400 (shown in FIG. 4).

FIG. 4 is illustrating directed graph 400 built based on the information within WSDL file 165. Vulnerabilities detection program 140 parses WSDL file 165 in order to identify each web method of web service 155 declared in WSDL file 165. Vulnerabilities detection program 140 adds a node within directed graph 400 for each web method identified utilized for sending a request web message. As a result, directed graph 400 includes nodes 402-404. In addition, to build directed graph 400 vulnerabilities detection program 140 can add an edge between two nodes to indicate a match exists between each of the web methods represented by the two nodes. Thus each edge indicates a match exists between a first web method (e.g., a web method represented by a node 402) and a second web method (e.g., a web method represented by a node 403), wherein the first and second web method can be referred to as a sequence of web methods. In the disclosed embodiment, vulnerabilities detection program 140 adds edges 450 and 451 between nodes 402 and 403, and adds edge 452 between nodes 404 and 403. Thus, based on the parsing of WSDL file 165, vulnerabilities detection program 140 identified matches between some of the output parameters and input parameters of web methods represented by nodes 402-404.

Vulnerabilities detection program 140 can utilize nodes 402-404, as well as edges 450-452 within directed graph 400 to generate sequences of web methods for testing stored vulnerabilities in web service 155. For example, in the disclosed embodiment, the sequences of web methods generated by vulnerabilities detection program 140 include two sequences, wherein the first sequence of web methods is RegisterCustomer 402 and GetCustomerDetails 403, and wherein the second sequence of web methods is GetCustomerOrders 404, GetCustomerDetails 403, and RegisterCustomer 402.

Figure 5:
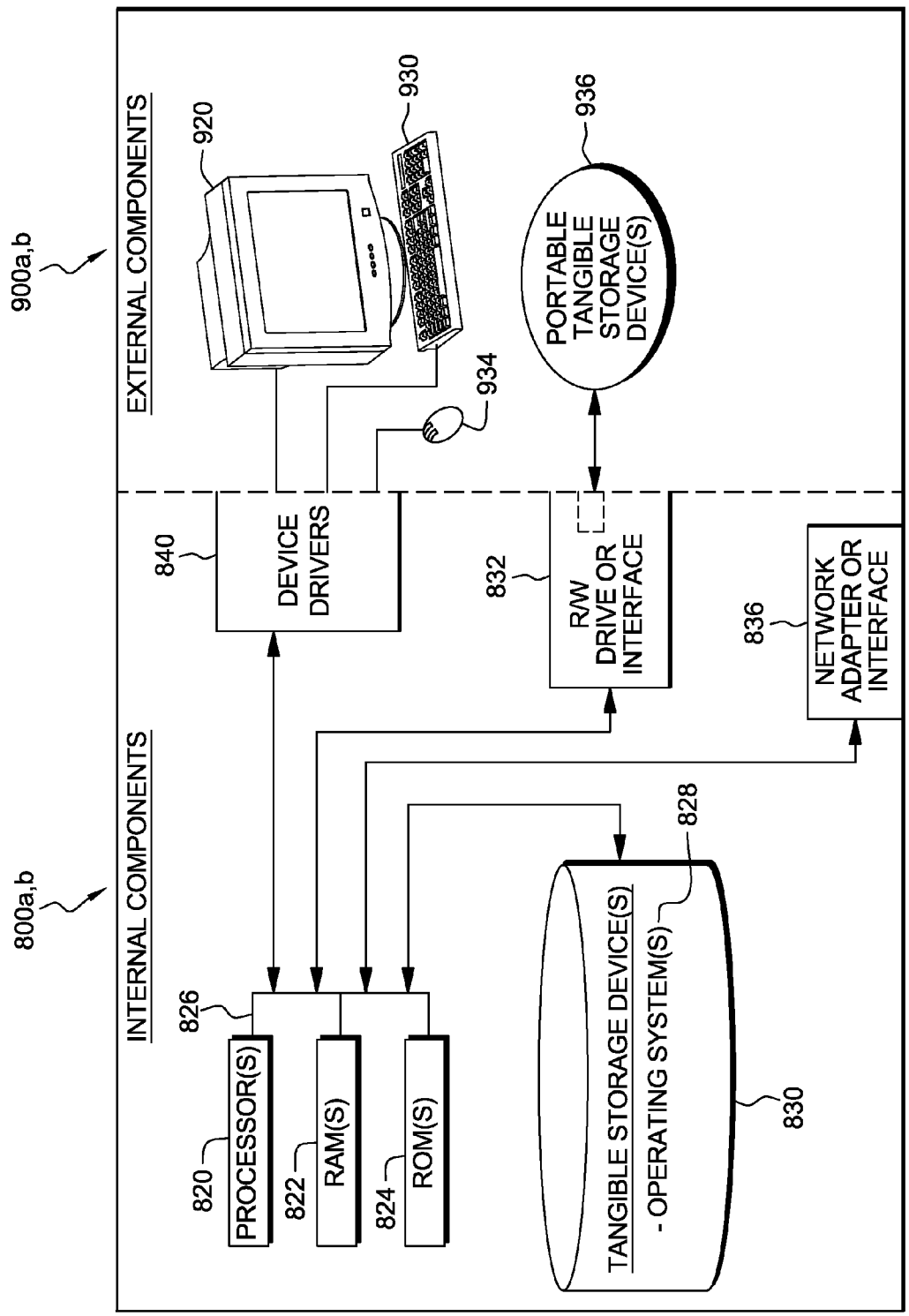
FIG. 5 is a block diagram depicting internal and external components of the client computer and the server computer of FIG. 1 according to an embodiment of the present invention.

FIG. 5 is a block diagram depicting a set of internal components 800a and a set of external components 900a that correspond to client computer 105a, as well as a set of internal components 800b and a set of external components 900b that correspond to server computer 105b. Internal components 800a and 800b each include one or more processors 820, one or more computer readable RAMs 822, one or more computer readable ROMs 824 on one or more buses 826, and one or more operating systems 828 and one or more computer readable tangible storage devices 830. The one or more operating systems 828, client software 130, and vulnerabilities detection program 140 on client computer 105a; and server software program 150 having web services 155 on server computer 105b are stored on one or more of the respective computer readable tangible storage devices 830 for execution by one or more of the respective processors 820 via one or more of the respective RAMs 822 (which typically include cache memory). In the embodiment illustrated in FIG. 5, each of the computer readable tangible storage devices 830 is a magnetic disk storage device of an internal hard drive. Alternatively, each of the computer readable tangible storage devices 830 is a semiconductor storage device such as ROM 824, EPROM, flash memory or any other computer readable tangible storage device that can store a computer program and digital information.

Each set of internal components 800a and 800b includes a R/W drive or interface 832 to read from and write to one or more portable computer readable tangible storage devices 936 such as CD-ROM, DVD, memory stick, magnetic tape, magnetic disk, optical disk or semiconductor storage device. Client software 130 and vulnerabilities detection program 140 on client computer 105a; and server software program 150 having web services 155 on server computer 105b can be stored on one or more of the respective portable computer readable tangible storage devices 936, read via the respective R/W drive or interface 832 and loaded into the respective hard drive or computer readable tangible storage device 830.

Furthermore, each set of internal components 800a and 800b also includes a network adapter or interface 836 such as TCP/IP adapter card, wireless wi-fi interface card, or 3G or 4G wireless interface card or other wired or wireless communication link. Client software 130 and vulnerabilities detection program 140 on client computer 105a; and server software program 150 having web services 155 on server computer 105b can be downloaded to respective computers 105a and 105b from an external computer or external storage device via a network (for example, the Internet, a LAN, or a WAN) and respective network adapters or interfaces 836. From the network adapter or interface 836, client software 130 and vulnerabilities detection program 140 on client computer 105a; and server software program 150 having web services 155 on server computer 105b are loaded into respective hard drive or computer readable tangible storage device 830. The network may comprise copper wires, optical fibers, wireless transmission, routers, firewalls, switches, gateway computers and/or servers.

Each set of external components 900a and 900b can include a computer display monitor 920, a keyboard 930, and a computer mouse 934. External components 900a and 900b can also include touch screens, virtual keyboards, touch pads, pointing devices, and other human interface devices. Each set of internal components 800a and 800b also includes device drivers 840 to interface to computer display monitor 920, keyboard 930 and computer mouse 934. The device drivers 840, R/W drive or interface 832 and network adapter or interface 836 comprise hardware and software in which the software is stored in computer readable tangible storage device 830 and/or ROM 824.

It should be appreciated that FIG. 5 provides only an illustration of one implementation and does not imply any limitations with regard to the environments in which different embodiments may be implemented. A variety of modifications to the depicted environments may be implemented. Moreover, a variety of modifications to the depicted environments may be made based on design and implementation requirements.

In accordance with the foregoing, a method, a computer system, and a computer program product have been disclosed for identifying stored vulnerabilities in a web service. However, numerous modifications and substitutions can be made without deviating from the scope of an embodiment of the invention. Therefore, one or more embodiments of the invention have been disclosed by way of example and not limitation.

What is claimed is:

1. A method for identifying stored vulnerabilities in a web service, the method comprising the steps of:
 identifying each web method, of a web service, declared in a web services description language (WSDL) file;
 adding a node within a directed graph for each web method identified;
 identifying pairs of web methods declared in the WSDL file in which a match exists between an output parameter of one of the web methods within one of the pairs identified, and an input parameter of another one of the web methods within the one of the pairs identified;
 adding an edge within the directed graph for each of the pairs of web methods identified;
 generating one or more sequences of web methods based on nodes connected by edges within the directed graph, wherein each of the one or more sequences of web methods includes at least one of the pairs of web methods identified, wherein the step of generating one or more sequences of web methods based on the directed graph comprises utilizing a breadth-first search to traverse each edge within the directed graph, and to access the nodes connected by one or more of the edges within the directed graph in order to identify a match between at least an output parameter of one of the web methods within the one of the pairs identified and an input parameter of another web method within the one of the pairs identified;
 responsive to determining that an amount of the generated one or more sequences of web methods exceeds a threshold, applying a heuristic to the directed graph to obtain a reduced amount of the generated one or more sequences of web methods for subsequent testing; and
 executing, by one or more processors, a vulnerabilities detection program to test each of the reduced amount of the generated one or more sequences of web methods to identify stored vulnerabilities in the web service.

2. The method of claim 1, wherein the step of identifying each web method, of the web service, declared in the WSDL file comprises parsing the WSDL file.

3. The method of claim 1, wherein the step of identifying pairs of web methods declared in the WSDL file comprises determining whether a complex data type of the output parameter of one of the web methods within the one of the pairs identified is identical to a complex data type of the input parameter of another one of the web methods within the one of the pairs identified.

4. The method of claim 1, wherein the step of identifying pairs of web methods declared in the WSDL file comprises determining whether a name of the output parameter of one of the web methods within the one of the pairs identified is identical to a name of the input parameter of another one of the web methods within the one of the pairs identified.

5. A computer program product for identifying stored vulnerabilities in a web service, the computer program product comprising:
 a non-transitory computer readable storage medium and program instructions stored on the non-transitory computer readable storage medium, the program instructions comprising:
  program instructions to identify each web method, of a web service, declared in a web services description language (WSDL) file;
  program instructions to add a node within a directed graph for each web method identified;
  program instructions to identify pairs of web methods declared in the WSDL file in which a match exists between an output parameter of one of the web methods within one of the pairs identified, and an input parameter of another one of the web methods within the one of the pairs identified;
  program instructions to add an edge within the directed graph for each of the pairs of web methods identified;
  program instructions to generate one or more sequences of web methods based on nodes connected by edges within the directed graph, wherein each of the one or more sequences of web methods includes at least one of the pairs of web methods identified wherein generating one or more sequences of web methods based on the directed graph comprises utilizing a breadth-first search to traverse each edge within the directed graph, and to access the nodes connected by one or more of the edges within the directed graph in order to identify a match between at least an output parameter of one of the web methods within the one of the pairs identified and an input parameter of another web method within the one of the pairs identified;
  program instructions to, responsive to determining that an amount of the generated one or more sequences of web methods exceeds a threshold, apply a heuristic to the directed graph to obtain a reduced amount of the generated one or more sequences of web methods for subsequent testing; and
  program instructions to execute a vulnerabilities detection program to test each of the reduced amount of the generated one or more sequences of web methods to identify stored vulnerabilities in the web service.

6. The computer program product of claim 5, wherein the program instructions to identify each web method, of the web service, declared in the WSDL file comprises parsing the WSDL file.

7. The computer program product of claim 5, wherein the program instructions to identify pairs of web methods declared in the WSDL file comprises determining whether a complex data type of the output parameter of one of the web methods within the one of the pairs identified is identical to a complex data type of the input parameter of another one of the web methods within the one of the pairs identified.

8. The computer program product of claim 5, wherein the program instructions to identify pairs of web methods declared in the WSDL file comprises determining whether a name of the output parameter of one of the web methods within the one of the pairs identified is identical to a name of the input parameter of another one of the web methods within the one of the pairs identified.

9. A computer system for identifying stored vulnerabilities in a web service, the computer system comprising:
 one or more processors, one or more computer readable memories, one or more non-transitory computer readable storage media, and program instructions stored on the one or more non-transitory storage media for execution by the one or more processors via the one or more memories, the program instructions comprising:
  program instructions to identify each web method, of a web service, declared in a web services description language (WSDL) file;
  program instructions to add a node within a directed graph for each web method identified;
  program instructions to identify pairs of web methods declared in the WSDL file in which a match exists between an output parameter of one of the web methods within one of the pairs identified, and an input parameter of another one of the web methods within the one of the pairs identified;

program instructions to add an edge within the directed graph for each of the pairs of web methods identified;

program instructions to generate one or more sequences of web methods based on nodes connected by edges within the directed graph, wherein each of the one or more sequences of web methods includes at least one of the pairs of web methods identified, wherein generating one or more sequences of web methods based on the directed graph comprises utilizing a breadth-first search to traverse each edge within the directed graph, and to access the nodes connected by one or more of the edges within the directed graph in order to identify a match between at least an output parameter of one of the web methods within the one of the pairs identified and an input parameter of another web method within the one of the pairs identified;

program instructions to, responsive to determining that an amount of the generated one or more sequences of web methods exceeds a threshold, apply a heuristic to the directed graph to obtain a reduced amount of the generated one or more sequences of web methods for subsequent testing; and program instructions to execute a vulnerabilities detection program to test each of the reduced amount of the generated one or more sequences of web methods to identify stored vulnerabilities in the web service.

10. The computer system of claim 9, wherein the program instructions to identify each web method, of the web service, declared in the WSDL file comprises parsing the WSDL file.

11. The computer system of claim 9, wherein the program instructions to identify pairs of web methods declared in the WSDL file comprises determining whether a complex data type of the output parameter of one of the web methods within the one of the pairs identified is identical to a complex data type of the input parameter of another one of the web methods within the one of the pairs identified.

12. The computer system of claim 9, wherein the program instructions to identify pairs of web methods declared in the WSDL file comprises determining whether a name of the output parameter of one of the web methods within the one of the pairs identified is identical to a name of the input parameter of another one of the web methods within the one of the pairs identified.

* * * * *